United States Patent [19]

Csicsery

[11] 4,187,199
[45] Feb. 5, 1980

[54] HYDROCARBON CONVERSION CATALYST

[75] Inventor: Sigmund M. Csicsery, Lafayette, Calif.

[73] Assignee: Chevron Research Company, San Francisco, Calif.

[21] Appl. No.: 939,578

[22] Filed: Sep. 5, 1978

Related U.S. Application Data

[62] Division of Ser. No. 772,170, Feb. 25, 1977, Pat. No. 4,137,151.

[51] Int. Cl.² ............................................. B01J 29/06
[52] U.S. Cl. ................................................. 252/455 Z
[58] Field of Search ..................... 252/455 Z; 208/120

[56] References Cited

U.S. PATENT DOCUMENTS

| | | | |
|---|---|---|---|
| 2,983,670 | 5/1961 | Seubold, Jr. | 252/455 Z |
| 3,255,101 | 6/1966 | Arey, Jr. et al. | 252/455 Z |
| 3,364,136 | 1/1968 | Chen et al. | 252/455 Z |
| 3,393,147 | 7/1968 | Dwyer et al. | 252/455 Z |
| 3,669,903 | 6/1972 | Bourguet et al. | 252/455 Z |
| 3,966,643 | 6/1976 | Scherzer et al. | 252/455 Z |

*Primary Examiner*—Carl F. Dees
*Attorney, Agent, or Firm*—D. A. Newell; R. H. Davies; W. D. Reese

[57] ABSTRACT

A composition useful in hydrocarbon conversion processes such as catalytic cracking is disclosed, comprising 0.05 to 10 weight percent lanthanum associated with a refractory support. The composition may also include 0.02 to 10 weight percent iron.

5 Claims, 8 Drawing Figures

HYDROCARBON CONVERSION CATALYST

CROSS-REFERENCE TO RELATED APPLICATIONS

This is a division of my copending application Ser. No. 772,170, filed on Feb. 25, 1977, now U.S. Pat. No. 4,137,151.

BACKGROUND OF THE INVENTION

The present invention relates to a composition useful in hydrocarbon conversion processes. In one aspect, the invention relates to a catalyst containing a zeolite and lanthanum, which finds particular use in fluid catalytic cracking processes.

Catalytic cracking systems typically employ a fluidized bed or moving bed of finely divided particulate catalyst. The cracking catalyst is subjected to continuous cycling between cracking reaction and catalyst regeneration systems. In a fluidized catalytic cracking (FCC) system, a stream of hydrocarbon feed is contacted with fluidized catalyst particles in a reaction zone, usually at a temperature of 800–1100° F., or higher. The reactions of hydrocarbons in the feed at the elevated conversion temperature result in deposition of carbonaceous coke on the catalyst particles and in the production of lower-molecular-weight hydrocarbons. After the processed hydrocarbons have been separated from the catalyst, the coked catalyst is stripped of volatiles and is passed to the catalyst regenerator. In the regenerator coked catalyst is contacted with an oxygen-containing gas and a desired amount of coke is burned off the catalyst particles, with heat evolved during the coke burnoff heating the catalyst particles. Heated and regenerated catalyst is returned to the reaction zone. The flue gas formed during coke burnoff is removed from the regenerator and passed into the atmosphere after appropriate treatment to remove solids, carbon monoxide, etc.

After regeneration, catalyst particles still contain some carbonaceous material. Removal of substantially all the coke from the catalyst during regeneration has been difficult when prior art systems have been used. Previously, when amorphous silica-alumina catalysts were used for catalytic cracking, there was little incentive to reduce the coke concentration in regenerated catalysts below about 0.2 weight percent. Most FCC catalysts now used, however, contain crystalline aluminosilicate zeolites, or molecular sieves. The zeolite-containing catalysts have usually been found to have higher activity and selectivity for the desired cracking reactions when the coke carbon content of the catalyst is as low as possible after regeneration. Thus, it is desirable to reduce the coke content of zeolite-containing catalysts as much as possible during regeneration. For this reason, increasing the degree of coke burnoff during regeneration has become an economic problem in the FCC processing art, the solution to which is presently being sought.

It is desirable to form $CO_2$ as a combustion product during catalyst regeneration in FCC units, as opposed to forming CO. The formation of $CO_2$ rather than CO increases the amount of heat released in the regenerator and reduces the amount of pollution control treatment needed before the regenerator flue gas can be passed into the atmosphere.

In addition to the degree of coke burnoff, the rate of coke burnoff in the catalyst regenerator is also important. A faster burnoff rate allows a smaller inventory of catalyst to be used in the regenerator and allows the regenerator to be sized smaller than would otherwise be possible.

It is known that the degree of coke burnoff and the rate of coke burnoff in an FCC catalyst regenerator can be increased by adding a promoter, such as a catalytic metal, to the FCC catalyst. Many promoter materials have been suggested in the art. Clearly, any promoter which is to be successfully used commercially must be extremely stable in order to withstand the continuous cycling between the high-temperature cracking reaction zone in the FCC system and the even higher-temperature regeneration zone. Several promoters which have been previously suggested have been found to be initially active in promoting a rapid coke burnoff rate and high degree of coke burnoff, but these promoters have been found to lose their effectiveness quite rapidly during operation under the severe conditions encountered in an FCC system. For example, one of the promoters found to be initially effective but to lose its effectiveness rapidly in commercial operations is chromia.

Netherlands patent application No. 72/03649 filed Mar. 17, 1972 discloses that cracking catalysts may be impregnated with rare earth metals to improve product yields and to reduce the amount of coke formed in the reaction zone. This application teaches that rare earth metals should be included in the catalyst in an amount about 1 to 5% greater than the amount which can be introduced into the catalyst by ion exchange with sodium or other cations in the zeolite component of the catalyst. The amount of rare earth metals utilized is calculated on the basis of $RE_2O_3$. The application alleges that catalysts promoted with the rare earth metals acquire excellent selectivity, providing a relatively high yield of gasoline and reducing coke make.

Netherlands patent application No. 73/00884, filed Jan. 22, 1973 describes the addition of cerium or of rare earth metal mixtures containing a substantial amount of cerium to zeolite-containing FCC catalysts. This application describes the use of catalysts containing 5 to 15% of a crystalline aluminosilicate zeolite which has previously been exchanged with rare earth metals and which is dispersed in an amorphous silica-alumina matrix. The catalyst material is washed and is then treated with a dilute solution containing cerium cations or a mixture of rare earth metal cations with a substantial amount of cerium content, and is then filtered and calcined. The application describes the catalyst as having the cerium statistically dispersed in the catalyst composition and states that the cerium should be present in an amount of 0.05 to about 4%, calculated as cerium oxide in addition to ion exchanged cerium. The catalysts which have been promoted with cerium are described as being substantially equal in catalytic cracking activity to the similar catalysts which have not been cerium-promoted. The cerium-promoted catalysts are stated to have regeneration rates appreciably higher than untreated zeolite catalysts. The application theorizes that the cerium promoter functions to increase the coke and CO oxidation rates during regeneration. It states that the other rare earth metal cations do not seem to have any particular effect when utilized as FCC catalyst promoters.

SUMMARY OF THE INVENTION

In an embodiment the present invention relates to a composition comprising lanthanum or a lanthanum compound in association with a porous inorganic oxide, the lanthanum being present in an amount between 0.05 and 10 weight percent of the composition, calculated as the elemental metal.

In a more limited embodiment, the invention relates further to a catalyst composition comprising 1 to 80 weight percent of a crystalline aluminosilicate zeolite, 0.05 to 10 weight percent lanthanum, and 0.05 to 10 weight percent iron, the lanthanum and iron calculated as the elemental metals and excluding lanthanum and iron in the crystal structure of the zeolite, in association with a porous refractory matrix.

In another embodiment, the present invention relates to a process for converting a hydrocarbon by contacting the hydrocarbon with the composition set forth above.

In another, more limited embodiment, the present invention relates to a process for catalytically cracking a hydrocarbon feedstock by contacting the feedstock with the above-defined catalyst compositions under catalytic cracking conditions.

I have found that lanthanum is a particularly effective promoter for cracking catalysts, especially those containing zeolites. The lanthanum provides a high rate of coke burnoff during catalyst regeneration as well as a high degree of coke burnoff, while having little adverse effect on the yield and quality of the cracked product. The lanthanum also increases the amount of $CO_2$ formed in the catalyst regenerator. Further, I have found that lanthanum is surprisingly stable when used as an FCC catalyst promoter, particularly in comparison with other rare earth metal promoters such as cerium. The lanthanum which is effective as an oxidation promoter, according to the invention, is dispersed in the catalyst, rather than forming a part of the crystal structure of my zeolitic crystalline aluminosilicate in the catalyst, and may effectively be used in conjunction with catalysts containing hydrogen-exchanged or rare earth-exchanged zeolites.

BRIEF DESCRIPTION OF THE DRAWINGS

The invention can be more fully understood by reference to the following detailed description of the invention and to the attached drawings, in which.

DETAILED DESCRIPTION OF THE INVENTION

The composition of the invention includes lanthanum or a lanthanum compound associated with a porous refractory organic oxide. The composition preferably includes a zeolite component dispersed in a porous refractory matrix. The zeolite component employed in the composition may be of any type, natural or synthetic, known to be useful in FCC cracking catalyst. The crystalline aluminosilicates used are typically made up of tetra-coordinated aluminum atoms associated through oxygen atoms with adjacent silicon atoms in the crystal structure. Most zeolites are prepared or occur naturally in the sodium form, so that sodium cations are associated with the electronegative sites in the crystal structure of the zeolites. Among the naturally occurring crystalline aluminosilicate zeolites which may be used in the present composition are particularly faujasite, mordenite, clinoptilolite, chabazite, analcite, erionite, as well as levynite, dachiardite, paulingite, noselite, ferriorite, heulandite, scolecite, stibite, harmotome, phillipsite, brewsterite, flarite, datolite, gmelinite, canrinite, leucite, lazurite, scaplite, mesolite, ptliolite, nepheline, matrolite and sodalite. Of the synthetic crystalline aluminosilicate zeolites which are useful in forming the catalyst, may be particularly mentioned Zeolite X, U.S. Pat. No. 2,882,244; Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H, U.S. Pat. No. 3,010,789; Zeolite J, U.S. Pat. No. 3,011,869; Zeolite L, Belgian Pat. No. 575,177; Zeolite M, U.S. Pat. No. 2,995,423; Zeolite O, U.S. Pat. No. 3,140,252; Zeolite Q, U.S. Pat. No. 2,991,151; Zeolite S, U.S. Pat. No. 3,054,657; Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. The zeolites described in U.S. Pat. Nos. 3,140,249 and 3,140,253 are also suitable for use.

The crystalline aluminosilicate zeolites having a faujasite-type crystal structure are particularly preferred for use in compositions according to the present invention. This includes particularly natural faujasite and Zeolite X and Zeolite Y.

The presence of sodium cations in the crystal structure of the zeolites is known to make them less stable when exposed to hydrocarbon conversion conditions, particularly high temperatures. Accordingly, the zeolite used in the composition may be ion-exchanged before or after incorporation as a component of the composition. Suitable cations for replacement of sodium in the zeolite crystal structure include ammonium (decomposable to hydrogen), hydrogen, rare earth metals, alkaline earth metals, etc. Various suitable ion-exchange procedures and cations which may be exchanged into the zeolite crystal structure are well known to those skilled in the art.

It is to be noted that, in calculating the amount of lanthanum present in the final composition, in accordance with the present invention, as well as in calculating the amount of iron optionally present in the composition, the only lanthanum or iron taken into account is lanthanum or iron present in the composition in a form other than as part of the crystal structure of any zeolitic crystalline aluminosilicate component. Thus, the limitations on the lanthanum (and iron) concentration do not refer to any lanthanum (or iron) introduced into the zeolite crystal structure by an ion-exchange technique, as referred to above, which is for an entirely different purpose, i.e., replacing the sodium cations in the zeolite to stabilize the zeolite. The amount of the crystalline aluminosilicate zeolite component present in the catalyst composition is between 1 weight percent and 80 weight percent of the total catalyst weight, and preferably between 5 weight percent and 20 weight percent.

Lanthanum is incorporated into the composition of the invention in an amount between 0.05 and 10 weight percent of the total composition weight after final preparation and treatment. In embodiments wherein the composition is used as a catalyst, lanthanum is preferably present between about 0.5 and 4 weight percent, calculated as the elemental metal and excluding any lanthanum that may be present in the crystal structure of any zeolite component of the catalyst, e.g., ion-exchanged lanthanum in a rare earth mixture. In embodiments wherein the composition is used as a carbon monoxide or coke combustion promoting additive, the lanthanum is preferably present in an amount between 1 and 10 weight percent. It is intended that any zeolite component of the composition may include rare earth metal cations, and, in particular, may include lanthanum cations. However, the weight percent lanthanum in the composition according to the invention includes only lanthanum other than any lanthanum cations that are ion-exchanged into the zeolite crystal structure. In one embodiment of the composition, iron is preferably incorporated into the composition along with the lanthanum. When utilized, the iron is incorporated into the composition in an amount between about 0.02 and 10 weight percent of the total composition weight, and preferably between about 0.05 and 4 weight percent, calculated as the elemental metal and excluding any iron that may be present in the crystal structure of any zeolite component of the composition, e.g., ion-exchanged iron. It is intended that a zeolite component may include iron or other Group VIII metals, but the weight percent iron in the composition according to the invention includes only iron other than any iron cations that are ion-exchanged into the zeolite crystal structure.

The lanthanum, and zeolite if employed, are associated with, and preferably dispersed in, a porous, refractory matrix material such as an inorganic oxide. Suitable inorganic oxides include silica, alumina, magnesia, boria, bauxite, titania, etc. Other suitable materials include silicon carbide, natural and treated clays, kieselguhr, diatomaceous earth, kaolin, mullite, etc. Mixtures of two or more of the above materials with each other or with other materials may also be employed. Suitable synthetic materials may be prepared in a conventional manner by the use of a hydrosol and hydrogel. Preferred matrix materials are siliceous gels or cogels and natural siliceous materials such as clays, which may be treated, e.g., by acid leaching. Particularly suitable materials are amorphous mixtures of inorganic oxides such as silica-aluminas, silica-magnesias, and amorphous oxides such as the latter combined with natural clays and clay-like materials, with amorphous silica-alumina mixtures being particularly preferred.

The composition of the invention can be prepared in any conventional manner, as by dispersing particles of any zeolite component in a hydrogel of the inorganic oxide or other matrix materials or by mixing solid particles of the zeolite and the porous, refractory matrix material along with a suitable binder. Lanthanum may be added to the matrix material or a zeolite component, if used, or both, or precursors of one or both, prior to combining the two, or after combination of the two.

When it is desired to add an iron component to the composition, the iron may be added to the matrix material, or to a zeolite component, or both, or a precursor of one or both, prior to combining them, or after. The lanthanum can be added prior to the iron, with the iron, or after the iron, when an iron component is used.

Preferably, when a zeolite component is used, the porous, refractory matrix and particles of the zeolite are first combined and then impregnated with a lanthanum compound. The impregnation may be performed in a manner known to those skilled in the art, e.g., by use of an aqueous solution of soluble lanthanum compounds such as the nitrate, chloride, carbonate, acetate or sulfate. The concentration of the lanthanum compound in an aqueous impregnation is not critical. For example, 10–200 g/liter of lanthanum chloride hexahydrate can suitably be used. The temperature, pressure, and other variables in the lanthanum impregnation procedure may be within conventional ranges. Likewise, in impregnating the iron component, the iron is preferably impregnated onto a previously formed combination of the zeolite component and the refractory matrix in a manner known to those skilled in the art, as by use of an aqueous solution of an iron compound. The concentration of the iron compound, like the lanthanum compound, in an aqueous impregnation solution, is not critical. After impregnation of a mixture of the zeolite and the refractory matrix with the desired amount of lanthanum, and optionally the desired amount of iron, the resulting composition may be dried at a temperature of 32–400° F., generally for at least ½ hour, and may then be calcined, preferably at 400°–1100° F. for ¼ hour to 4 hours.

In one embodiment, a conventional cracking catalyst containing a crystalline aluminosilicate zeolite in a porous, refractory matrix, such as an FCC catalyst, can be impregnated with a suitable amount of lanthanum. The conventional cracking catalyst used to form the composition may be either fresh, unused catalyst, or may be previously used catalyst which has been removed from a cracking unit, e.g., equilibrium catalyst. Thus, the mixture of the zeolite and matrix to be impregnated with lanthanum may, in some cases, contain small amounts of coke carbon and other contaminant materials normally found on used cracking catalysts. The amount of carbon in a used catalyst to be impregnated may be as much as 0.5 weight percent or more, but is usually about 0.2–0.5 weight percent of the total weight of the used catalyst to be impregnated.

The composition of the invention may be employed as a catalyst in a variety of hydrocarbon conversion processes such as catalytic cracking, alkylation, dealkylation, isomerization and polymerization. The hydrocarbon conversion may be carried out by contacting a suitable hydrocarbon feed with the catalyst composition at conventional temperature, pressure and other hydrocarbon conversion conditions known to be suitable for carrying out the desired reaction. For alkylaromatics isomerization, for example, a temperature of about 600–900° F. is generally employed and the isomerizable alkylaromatic hydrocarbon is often contacted with the catalyst in the presence of hydrogen at a pressure of 100–500 psig. The presence or absence of a hydrogen atmosphere in a particular hydrocarbon conversion process will normally be dictated by the conventional conditions utilized with the process. The composition of the invention may be used in the form of a fixed bed and the hydrocarbon feed passed over the catalyst in upflow or downflow or the like. The catalyst may also be used as a moving bed or fluidized bed in cocurrent or countercurrent flow with the hydrocarbon feed.

The present composition is particularly suitable for use in catalytic cracking of hydrocarbons, especially in fluidized catalytic cracking. The temperature, pressure and other operating conditions employed in the reaction zone and regeneration zone in a catalytic cracking system using the present catalyst may be within conventional ranges. Generally, a temperature between 800–1300° F., preferably between 850–1100° F., and a pressure between about atmospheric and 100 psig, preferably 5–30 psig, are used in the reaction zone. A catalyst/hydrocarbon weight ratio of about 3 to about 10 is preferably used. A hydrocarbon weight space velocity in the reaction zone of about 0.5 to about 50 per hour is also preferably used. The average amount of coke contained in the catalyst when it is passed from the reaction zone to the regeneration zone is preferably between about 0.5 and 2.5 weight percent of the total catalyst weight.

The catalyst regeneration zone used in a cracking system employing the present invention may be of conventional design. The gaseous atmosphere within the regeneration zone includes a mixture of gases which vary in concentration according to the locus within the regenerator. Generally the gases include 5–25% steam, nitrogen, varying amounts of oxygen, carbon monoxide, carbon dioxide, sulfur oxides, etc. The temperature in the regeneration zone may very between about 1000° F. and 1500° F., and is preferably maintained between about 1100° F. and 1400° F.

The hydrocarbon feeds employed in the cracking operation when the present composition is used as the catalyst may suitably be the same as those used in conventional operations, e.g., gas oils, light cycle oils, heavy cycle oils, etc. Lighter and heavier hydrocarbons, such as naphtha-boiling-range stocks and residua, may also be treated in a cracking system employing the present catalyst. For example, see U.S. Pat. No. 3,761,394. A suitable feed may include petroleum-derived hydrocarbons as well as shale oil or coal-derived hydrocarbons, and may include recycled hydrocarbons which have previously been subjected to cracking.

The present composition may also be used as an additive for use in relatively small amounts in admixture with a conventional hydrocarbon cracking catalyst. When used as an additive, the amount of the composition employed in a catalytic cracking system is preferably between 10 parts per million, by weight, and 10 weight percent of the total cracking catalyst inventory in the cracking system. The present composition, when added to a cracking catalyst circulating in a cracking system, can promote combustion of carbon monoxide to carbon dioxide in the catalyst regenerator, and can promote the burnoff of coke on the cracking catalyst.

EXAMPLES

The following examples demonstrate the operation of the present invention, compare a catalyst according to the present invention to other catalysts when used in fluidized catalytic cracking operations, and illustrate preferred embodiments of the composition and its preparation and use.

EXAMPLE 1

Catalysts promoted to improve their coke-burning rate were prepared by impregnating a commercial cracking catalyst, F-800, believed to be a natural clay-based material whose catalytic activity has been enhanced by a series of hydrothermal and/or purification treatments. It contains about 10% of a zeolite whose x-ray diffraction pattern resembles that of faujasite. The zeolite had been rare earth-exchanged. The catalyst contained 47–48% $Al_2O_3$, with most of the remainder being silica. It comes as a fine powder, apparently spray dried, with an average particle size of about 60 microns. The particular sample of the commercial catalyst used in these experiments was drawn from the regenerator of a commercial FCC plant running under steady-state conditions. It contained some carbon (coke) and trace metals and had lost the very high activity associated with fresh, unused cracking catalyst. The coke was burned off by heating at 1100° F. in air for 4 hours. This sample is referred to as "equilibrium F-800 No. 1". It had the inspections given in the following table:

Table I

| Impurities Wt.% | |
| --- | --- |
| Iron | 0.3–0.6 |
| Nickel | 0.002 |
| Chromium | 0.004 |
| Copper | 0.025 |
| Vanadium | 0.16 |
| Sodium | 0.45 |
| Magnesium | 0.2 |
| Carbon | 0.05 |
| Pore volume, ml/g | 0.371 |
| Surface Area, mb!2/g | 71 |
| Bulk Density | 0.795 |

A comparison catalyst was prepared by impregnating 500 g of the equilibrium F-800 with 186 ml of an aqueous solution of 14.8 g of No. 480 Rare Earth Nitrate Pentahydrate. The nitrate sample consisted of a mixture of nitrates containing individual rare earth cations in the following proportions:

Table II

| Cerium, % | 46.8 |
| --- | --- |
| Lanthanum, % | 33.7 |
| Neodymium, % | 13.4 |
| Praseodymium, % | 4.5 |
| Other Rare Earths, % | 1.6 |

The pH of the impregnating solution was 4.39. The catalyst and the aqueous solution formed a doughly mass which was thoroughly kneaded for 15–20 minutes. It was then slowly heated and dried in a vacuum at 200° F. Finally, it was calcined for an hour at 350° F. and an additional hour at 800° F. in flowing dry air. The catalyst contained 1% (calculated as metal) of rare earths in addition to the rare earths already present in the equilibrium F-800. This comparison catalyst was labeled "Catalyst A".

A catalyst according to this invention was prepared by impregnating 400 g of the equilibrium F-800 with 150 ml of a solution containing 12.46 g of 99%+ pure lanthanum nitrate hexahydrate. The pH of the impregnating solution was 3.7 The method of treatment was identical to that used for Catalyst A. This was labeled "Catalyst B". It contained 1% of added lanthanum, calculated as the elemental metal.

EXAMPLE II

Catalysts A and B and equilbrium F-800 were tested for cracking activity and coke-burning rate. The tests were run in a fluid catalyst testing unit patterned after the one described by Johnson and Stark in "Industrial Engineering Chemistry", April 1953, page 849, with some modification. The feedstock for these runs was a mixture of gas oils from West Coast, U.S.A., and Indonesian crudes having the following characteristics:

Table III

| Feedstock Characteristics | |
|---|---|
| Source of Feed | ⅓ Indonesian |
|  | ⅔ California |
| Gravity, °API | 23.7 |
| Aniline Point, °F. | 161.9 |
| Sulfur, wt.% | 0.77 |
| Nitrogen, wt.% | 0.30 |
| ASTM-D-1160 Distillation | |
| Percent Distilled | °F. |
| ST | 455 |
| 5 | 533 |
| 50 | 738 |
| 95 | 966 |
| EP | 972 |

Figure 1:
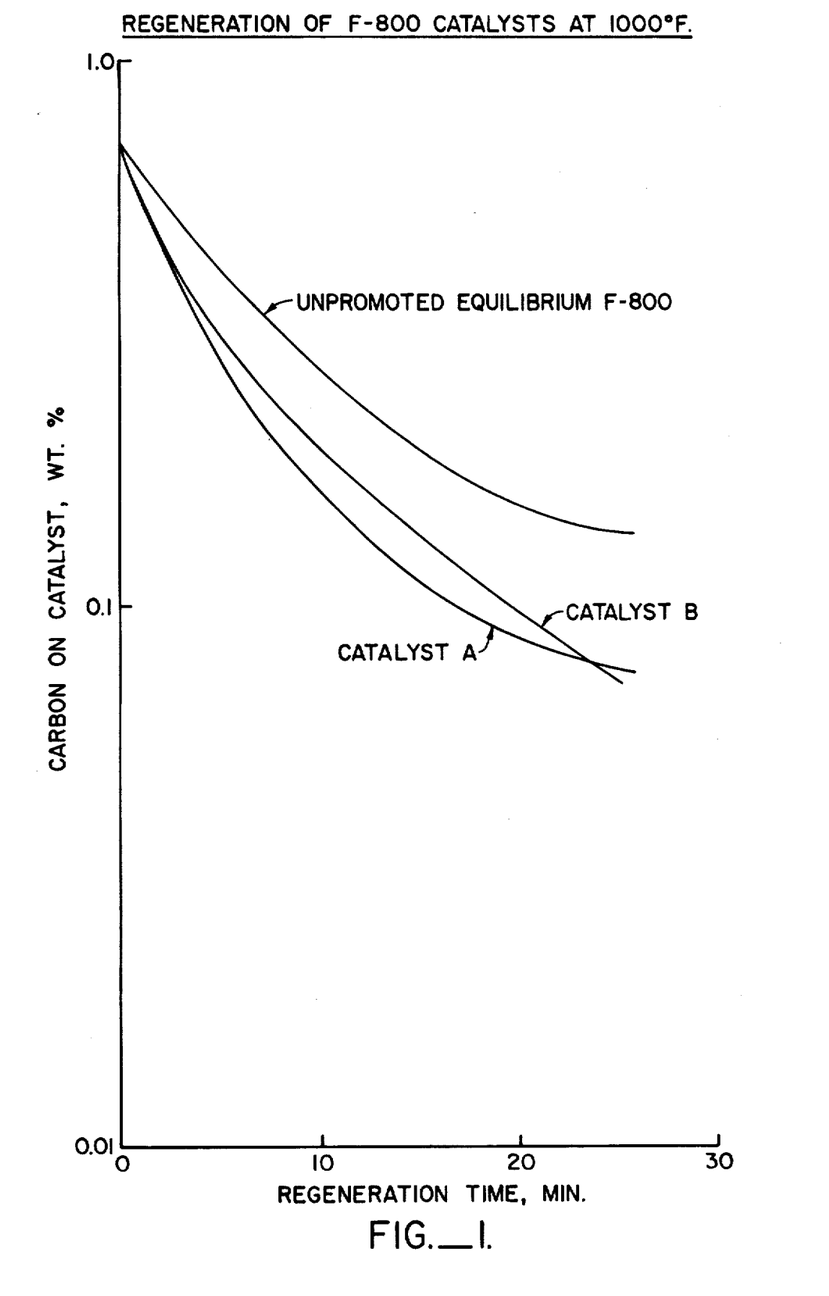
FIG. 1 shows the comparative degree of coke burnoff in regeneration of a catalyst according to the invention and two other comparison catalysts.
Figure 2:
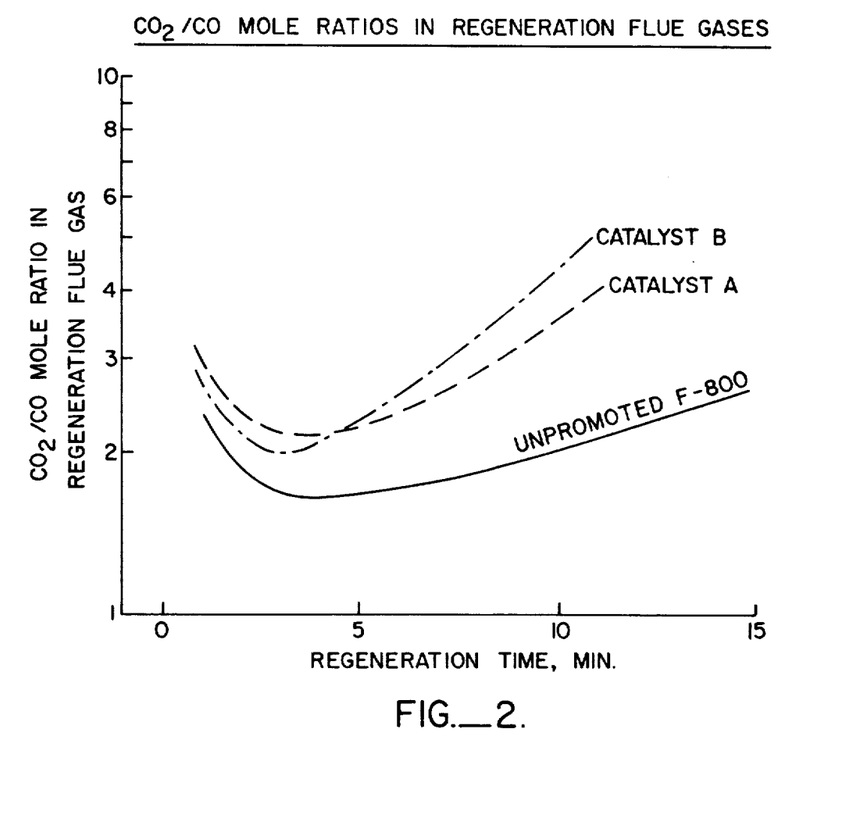
FIG. 2 shows the comparative completeness of combustion to $CO_2$ during regeneration of the catalysts referred to in FIG. 1.

Ten cracking and regenerator cycles constitute one test, lasting two days. Cracking conditions were: 300-g initial catalyst charge, 5-minute-long cracking cycles at 925° F. and 10 psig, 30-g/min. feed rate, and 2-ml/min. water injection. The catalyst was regenerated with undiluted air (5800 ml/min. STP or 0.054 g-mol $O_2$/min.). Regenerations started at 1050° F., except when samples of catalysts or flue gases were taken. Regenerations in these cycles started at 1000° F. Catalyst samples are taken during the fifth and tenth cycle at 0, 2, 4, 6, 10, 15, 20 and 25 minutes after the beginning of the regeneration. The sampling procedure was as follows: Air in the reactor was first displaced by nitrogen, and fluidization was stopped before each sampling. To avoid continued oxidation, samples were cooled in flowing nitrogen gas before exposure to air. Total sampling time was 2-3 minutes. By the end of the 10th cycle, sampling consumed about 30 g of catalyst or 10% of the total charge. Unburned coke was determined on these samples by the combustion technique using a Coleman Carbon Analyzer. Regeneration flue gases were sampled during the fourth and ninth cycles at 1, 3, 4, 5, 10 and 15 minutes after the beginning of the regenerations. These samples were analyzed for $CO_2$, $CO$ and $O_2$. The amount of coke in Cycles 1, 2, 3, 6, 7 and 8 was determined by oxidizing all $CO$ to $CO_2$ in a flue gas sidestream and absorbing all $CO_2$ on Ascarite. Reaction temperature profiles during regeneration showed oxidation exotherms. Within the first two minutes of the regeneration, temperatures increased between 16° F. and 100° F. Liquid products from Cycles 3, 4, 6, 7 and 8 were combined and analyzed together. Product gas samples from Cycles 2, 3, 6, 7 and 8 were analyzed separately. The first cycle was not felt to be representative, so its results were disregarded and its product was discarded. The rate of coke burning for each catalyst is shown in FIG. 1. When comparing the catalysts, the comparison is between coke burning rates in the fifth cycle for each. Coke is burned from both Catalyst A and Catalyst B more rapidly than it is from unpromoted F-800. On the basis of burning rate alone, the mixed rare earths (catalyst A) are a somewhat more effective promoter than pure lanthanum (Catalyst B). This is believed to be due to cerium, which makes up nearly 60% of the mixed rare earths. FIG. 2 shows the effect of the rare earth promoters on the $CO_2$/$CO$ ratio in the flue gas. Both promoters increase the rate of combustion of the carbon monoxide. The difference between the two promoters is small. Product analysis indicated that the promoters lowered conversion slightly. Yields and product distributions showed little, if any, change from the unpromoted catalyst. Lanthanum appears to lower coke-make 10-15%, which is usually advantageous.

EXAMPLE III

Figure 3:
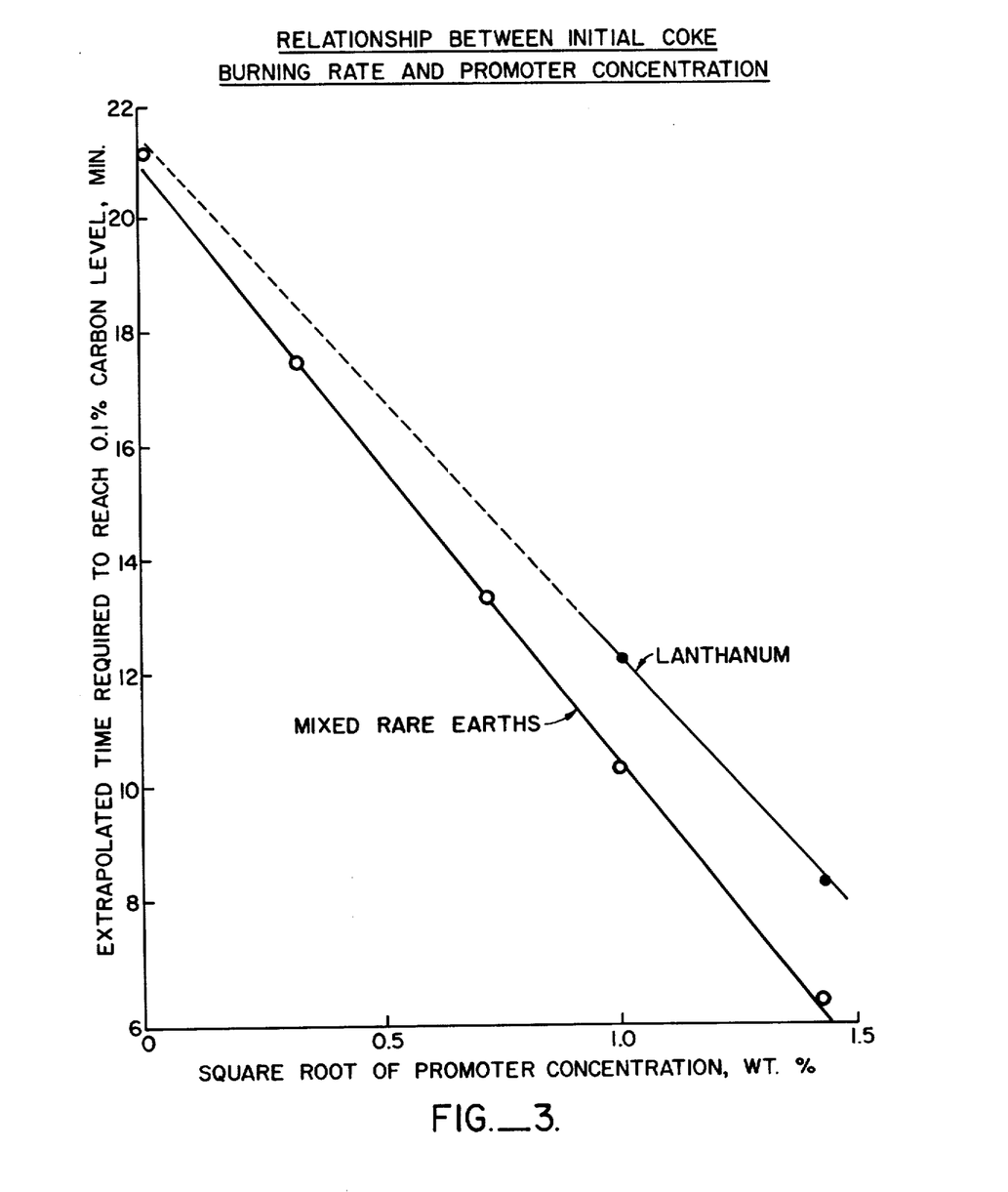
FIG. 3 shows the comparative relationship between the initial coke burning rate and promotor metal concentration for a catalyst containing mixed rare earth metals and a catalyst containing lanthanum alone.

A series of catalysts was made by impregnating F-800 with varying concentrations of mixed rare earth nitrate and of lanthanum nitrate. The catalysts were made by the same methods used in preparing Catalysts A and B and were tested by the procedure described in Example II. The results are shown in FIG. 3. The coke-burning rates are proportional to the square root of the concentration of promoter in the finished catalyst. On the basis of burning rate alone, the mixed rare earths again appear to be a somewhat more effective promoter than pure lanthanum.

EXAMPLE IV

A promoted catalyst was prepared by impregnating a commercial cracking catalyst with a lanthanum salt. The base catalyst was CBZ-1—a widely used cracking catalyst sold by Davison Chemical, a division of W. R. Grace & Co., Baltimore, Maryland. It is semi-synthetic catalyst containing 30-35% of a kaolin-type clay and about 15% of a rare earth-exchanged zeolite. The balance is an amorphous silica-alumina matrix. The catalyst has an average particle size of about 60 microns. The particular sample of CBZ-1 used was drawn from the regenerator of a commercial FCC plant running under steady-state conditions. It had, therefore, picked up some carbon (coke) and traces of metal and had lost the very high activity associated with fresh, unused catalyst. Carbon was burned off the catalyst in the manner described for F-800 in Example I. The resulting catalyst is referred to as "equilibrium CBZ 1". Some of its properties are given in the following table:

Table IV

| Impurities, Wt.% | |
|---|---|
| Iron | 0.2 |
| Nickel | 0.016 |
| Chromium | 0.005 |
| Copper | 0.028 |
| Vanadium | 0.023 |
| Carbon | 0.41 |
| Pore Volume, ml/g | 0.385 |
| Surface Area, m²/g | 107 |
| Bulk Density | 0.77 |

10,000 g of equilibrium CBZ-1 was mixed with 3850 ml of a solution containing 623 g of lanthanum nitrate hexahydrate. The dough mass was thoroughly kneaded and was dried by heating in a muffle furnace for 4 hours at 800-900° F. It was then calcined in dry air at 1100° F. The final catalyst, "Catalyst C", contained 2% by weight lanthanum on an elemental metal basis in addition to the amount of lanthanum already present in the rare earth exchanged zeolite of the CBZ-1. A comparison catalyst, "Catalyst D", was prepared in the same manner. It contained 2% by weight of mixed rare earths having the distribution given in Table II, calculated on an elemental metal basis.

EXAMPLE V

Figure 4:
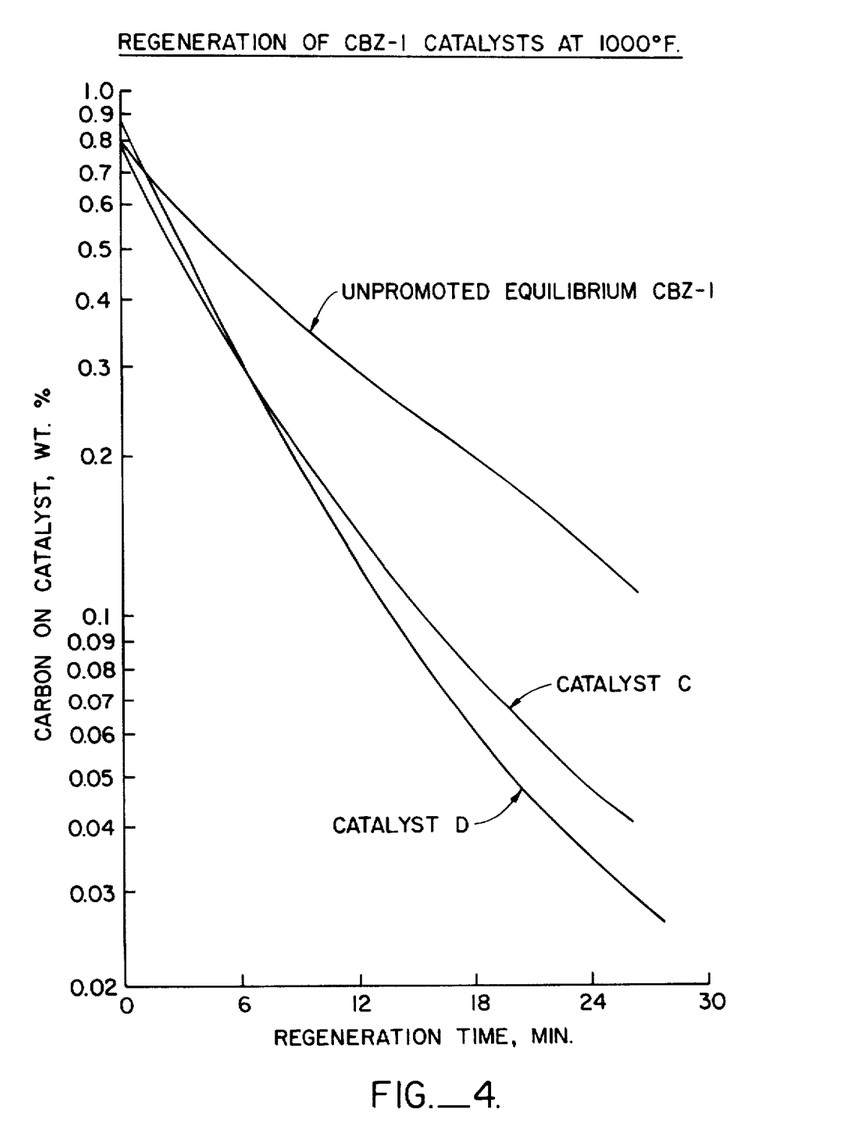
FIG. 4 shows comparative degree of coke burning for a catalyst according to the invention and two other catalysts.

The coke-burning rates of Catalyst C and Catalyst D were measured by the method described in Example II. The results are shown in FIG. 4. Coke is burned from both of the promoted catalysts at a much more rapid rate than it is from unpromoted CBZ-1. Again, the burning rate for the catalyst of this invention containing lanthanum, Catalyst C, is not quite as fast as that of the comparison catalyst, Catalyst D. Catalyst D contains more cerium than lanthanum, and cerium is known to be an active oxidation promoter. In order to test the stability of these catalysts, they were run for protracted periods of time in a continuous fluid catalytic cracking pilot plant under conditions approximating those of sever commercial use. In the plant, preheated feed is mixed with the circulating catalyst, flows through a 6-foot section of adiabatic riser, and enters the dense bed in a stripping vessel. A combination of a short riser and a dense bed is used so as to match many commercial FCC units. Reaction mix leaving the reactor is taken overhead. Spent catalyst is discharged from the dense bed and stripped with nitrogen before being transferred to a regenerator. Catalyst transfer is controlled using variable speed screw feeders at the bottom of spent catalyst and regenerated catalyst standpipes. The holdup of the unit is about 4000 g of catalyst. The feed to the continuous unit was a Gulf Coast gas oil having the characteristics shown in Table V.

Table V

| Feedstock Characteristics | |
|---|---|
| Source of Feed | Gulf Coast-USA |
| Gravity, °API | 21.5 |
| Aniline Point, °F. | 189.4 |
| Sulfur, Wt. % | 0.44 |
| Nitrogen, Wt. % | 0.086 |
| ASTM-D-1160 Distillation | |
| % Distilled | F. |
| ST | 666 |
| 5 | 746 |
| 50 | 888 |
| 95 | 1033 |
| EP | 1040 |

Figure 5:
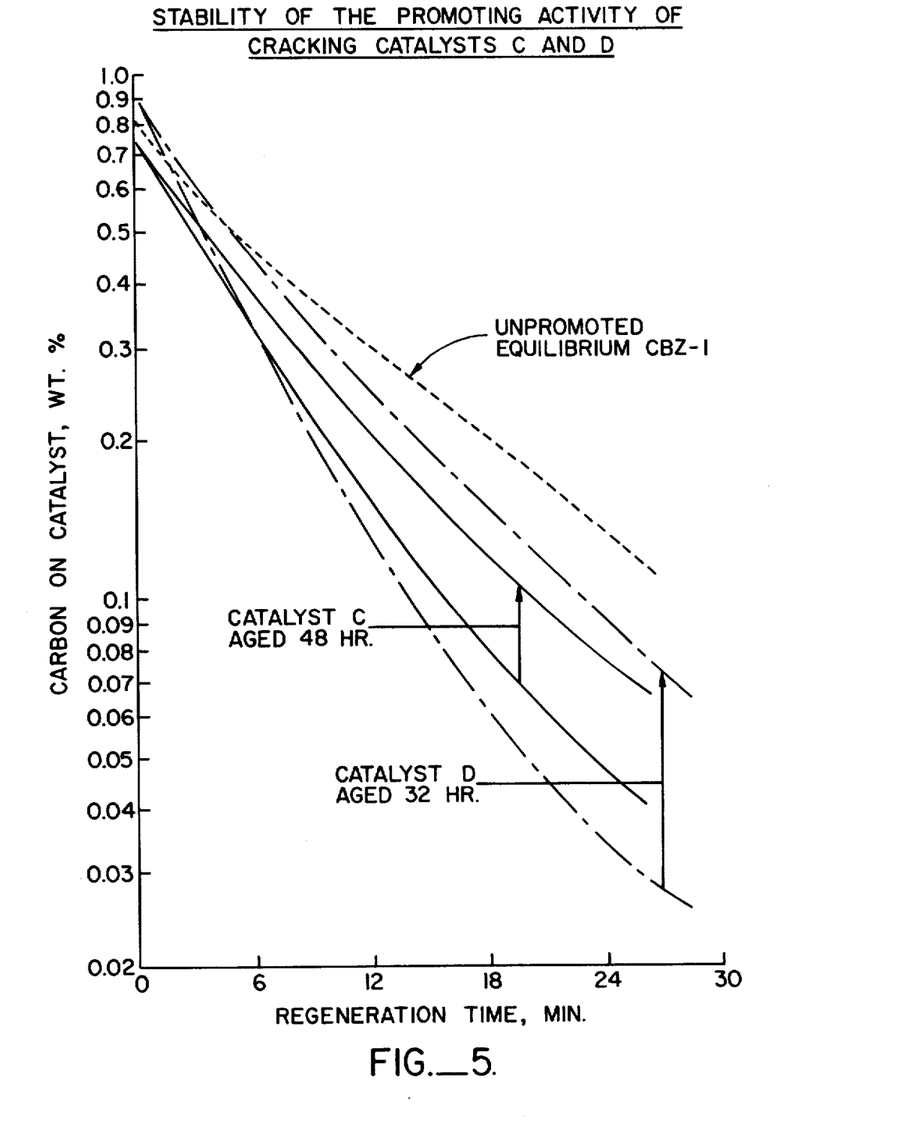
FIG. 5 shows the comparative stability of the catalyst according to the invention and the two other catalysts referred to in FIG. 4 for the degree of catalyst regeneration.
Figure 6:
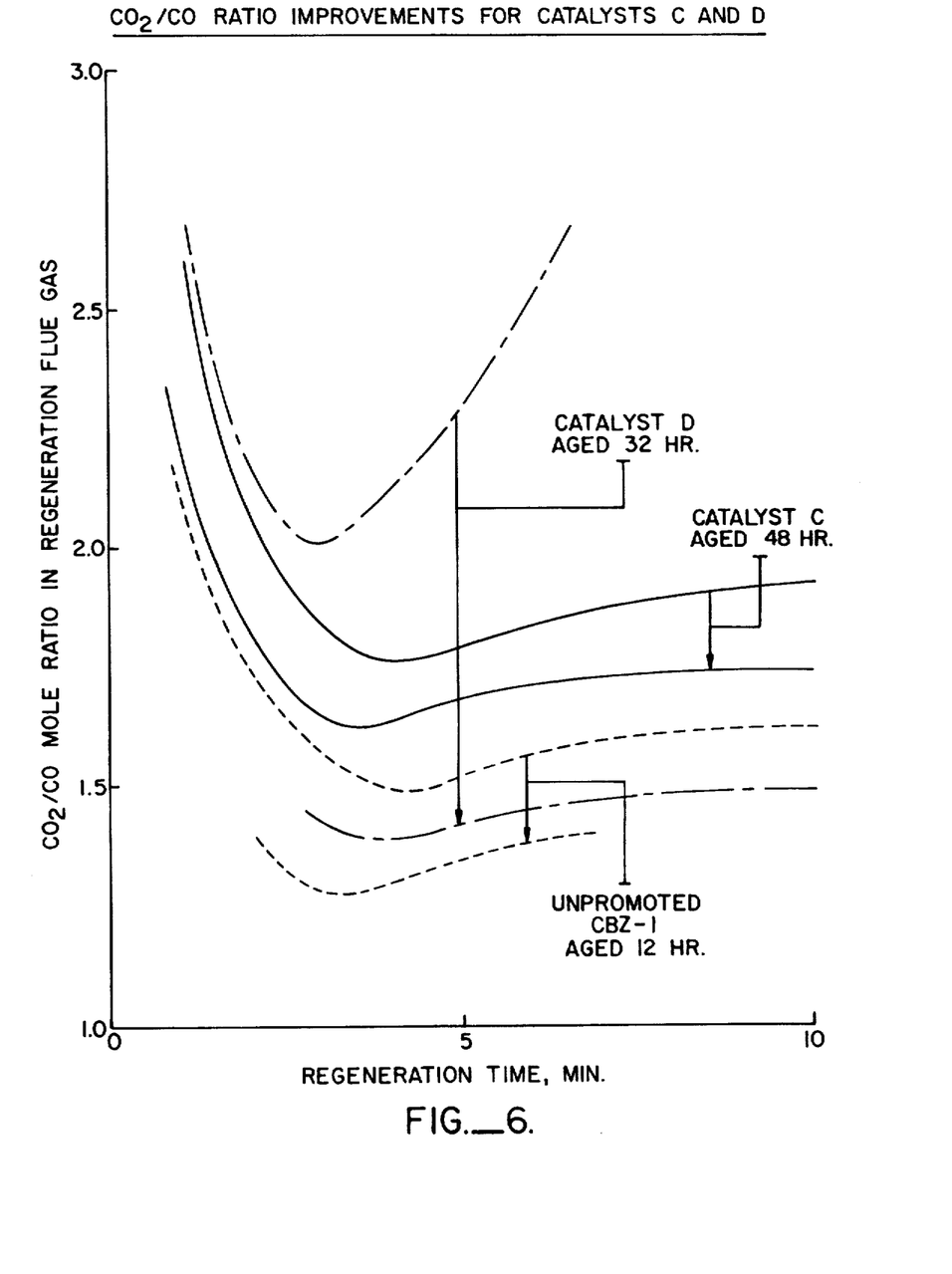
FIG. 6 shows the comparative stability of the catalysts referred to in FIGS. 4 and 5 for the completeness of combustion to $CC_2$.

The unit was run with a cracking temperature of 930° F. and a catalyst circulation rate of 8585 g/min. and an oil feed rate of 2113 g/hour. Conversion was about 65% of the feed. Carbon on the spent catalyst was about 1.5%. Catalyst was regenerated using air and oxygen in the upper section of the regenerator. The regeneration temperature was controlled at 1200° F.—a relatively severe condition, which was chosen to accentuate any tendency toward instability. The oxygen content of the off-gas was controlled at about 2.5% in order to maintain the carbon content of the regenerated catalyst at about 0.35%—a value which is typical of many commercial FCC units. A sample of Catalyst C was aged for 48 hours in the continuous fluid catalytic cracking pilot plant. This is equivalent to about 96 batch cracking regeneration cycles. A comparison sample of Catalyst D was similarly aged for 32 hours or 64 equivalent batch samples. After aging they were again tested by the method of Example 2. FIG. 5 shows the burning rates of the two catalysts. The rates before aging, repeated from FIG. 4, are included for comparison. The spread between the two curves for each catalyst, as designated by the heavy vertical arrows, shows the extent to which the coke-burning rates of the two catalysts deteriorated on aging. The additive of comparison Catalyst D, largely cerium, was initially a more powerful promoter of coke burning than the pure lanthanum of Catalyst C, prepared according to the present invention. However, after only 32 hours of high-temperature aging, the coke-burning rate of Catalyst D was lower than that of the sample of Catalyst C, which had been aged for 48 hours. During the regeneration tests, the $CO_2/CO$ ratios in the off-gas before and after aging, as described above, were also measured. The results are shown in FIG. 6. With regard to its ability to promote oxidation of CO to $CO_2$, the lanthanum-containing catalyst, Catalyst C, is far more stable than Catalyst D, which was promoted with mixed rare earths.

EXAMPLE VI

Catalysts promoted to improve their coke-burning rate were prepared by impregnating a commercial cracking catalyst with added ingredients. The base catalyst was the same F-800 used in the tests described in Example I. Coke was burned off the catalyst as described in Example I, and the resulting equilibrium catalyst had the properties shown in Table I. A comparison catalyst was prepared by impregnating 500 g of the equilibrium F-800 with 186 ml of an aquous solution of 7.4 g of No. 480 Rare Earth Nitrate Pentahydrate, having the composition shown in Table II. The pH of the impregnating solution was 5.02. The catalyst and the aqueous solution formed a doughy mass which was thoroughly kneaded for 15–20 minutes. It was then slowly heated and dried in a vacuum at 200° F. Finally, it was calcined for an hour at 350° F. and an additional hour at 800° F. in flowing dry air. The catalyst contained 0.5% (calculated as metal) of rare earths in addition to the rare earths already present in the equilibrium F-800. This promoted catalyst will be referred to as "Catalyst E". A second 400-g sample of equilibrium F-800 was impregnated with 150 ml of an aqueous solution containing 2.9 g of ferric nitrate nonahydrate. This is sufficient to add 0.1% of iron to the catalyst. The impregnating solution had a pH of 2.53. The conditions of impregnating and drying were the same as above. The catalyst so obtained is designated "Catalyst F". Another 400-g sample of equilibrium F-800 was impregnated in the same fashion with 150 ml of a solution containing both 7.4 g of the rare earth nitrate and 2.9 g of the iron nitrate. The pH of the solution was 2.3. This catalyst, "Catalyst G", contained 6.2% of added rare earth and 0.1% of added iron.

EXAMPLE VII

Figure 7:
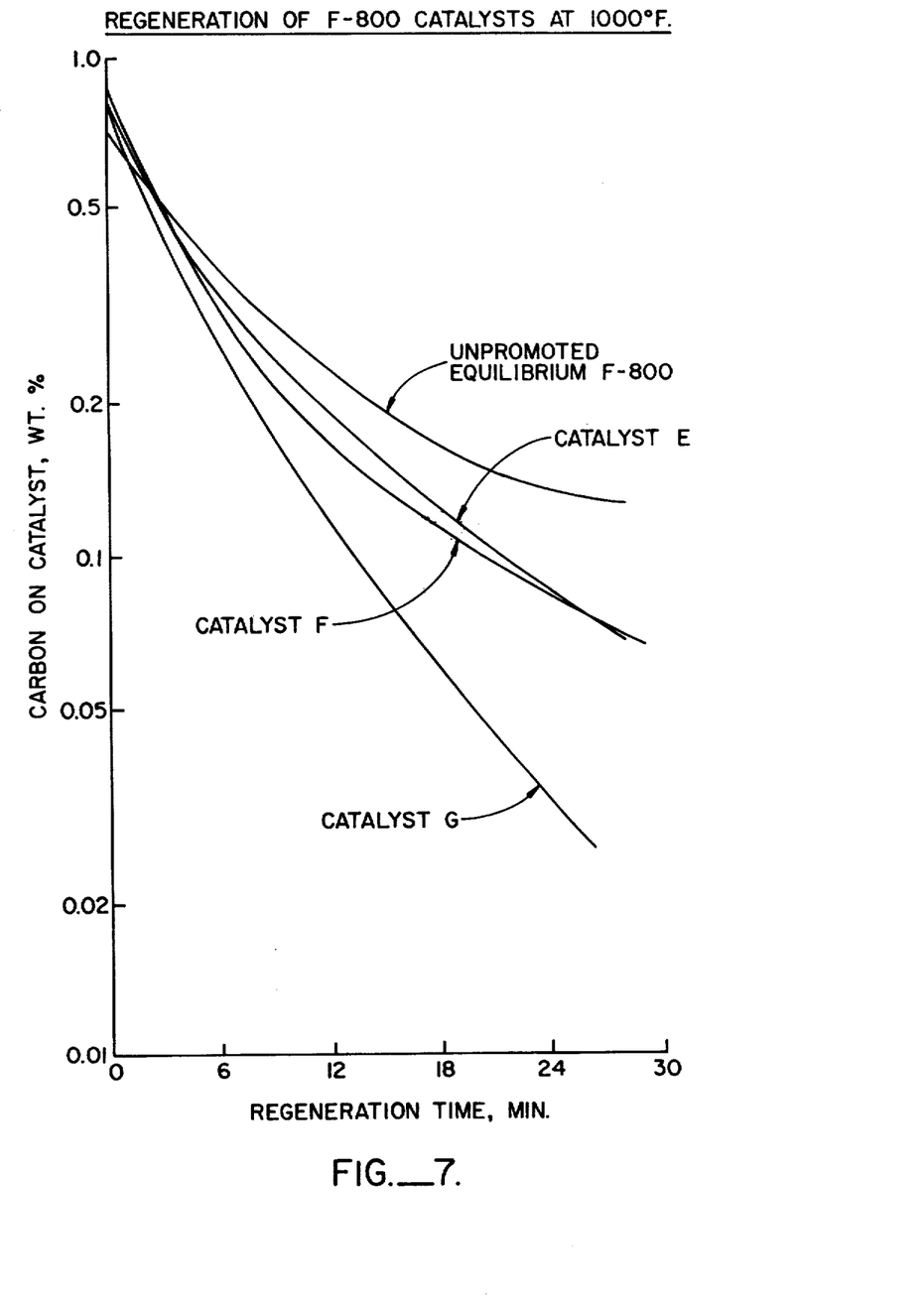
FIG. 7 shows the comparative degree of coke burnoff in regeneration of a catalyst according to the invention and two other catalysts.

Catalysts E, F and G and equilibrium F-800 were tested for cracking activity and coke burning rate. The tests were run in the same fluid catalyst testing unit used in the tests described in Examples II and V. The feedstock for these runs was the same feedstock used in the tests described in Examples II, having the characteristics shown in Table III. The tests were performed in exactly the same manner described in Example II. Typical curves showing the rate of coke burning are given in FIG. 7. In each case, the rate of burning is that measured during the fifth cycle. The coke is burned from both Catalyst E and Catalyst F more rapidly than it is from unpromoted F-800. This promoting effect is remarkable in view of the fact that equilibrium F-800 already contains both rare earths and iron. It may be that the metals deposited on the catalyst by impregnation are in a different form from those present in the equilibrium material. The burning curve for Catalyst G lies well below those of Catalysts E and F, and the promoting effect appears to be greater than one would expect on the basis of pure additive behavior. I do not wish to be limited by any theoretical explanation, but the shape of the curves for Catalysts E and F suggests a possible reason for the cooperative behavior. The curve for iron-containing Catalyst F drops sharply at the beginning of the burning cycle when the coke content of the catalyst is high, but then it levels off. The rare earth promoter of Catalyst E is less effective at high coke levels, but its curve does not level out as rapidly at lower coke levels. The combination of the two promoters appears to provide a synergistic effect at both high and low coke levels.

EXAMPLE VIII

Promoted catalysts were prepared by impregnating a commercial cracking catalyst with a lanthanum and/or iron salt. The base catalyst was the same CBZ-1 used in the tests described in Examples IV–V. Coke was burned off the catalyst in the manner described in Example IV, and the resulting equilibrium catalyst had the properties shown in Table IV. 10,000 g of equilibrium CBZ-1 was mixed with 3850 ml of a solution containing 623 g of lanthanum nitrate hexahydrate. The doughy mass was kneaded and was dried by heating in a muffle furnace for 4 hours at 800–900° F. It was then calcined in dry air at 1100° F. The final catalyst, "Catalyst H", contained 2% of lanthanum in addition to the amount already present in the exchanged zeolite of CBZ-1. A dual-promoted CBZ-1 catalyst was prepared by impregnating 400 g of equilibrium CBZ-1 with 155 ml of a solution containing 11.22 g of lanthanum nitrate hexahydrate and 2.9 g of ferric nitrate nonahydrate. The method of treatment was that of Example VI. The quantities of salts used were sufficient to give 0.9% of added lanthanum and 0.1% of added iron. This is "Catalyst I".

EXAMPLE IX

Figure 8:
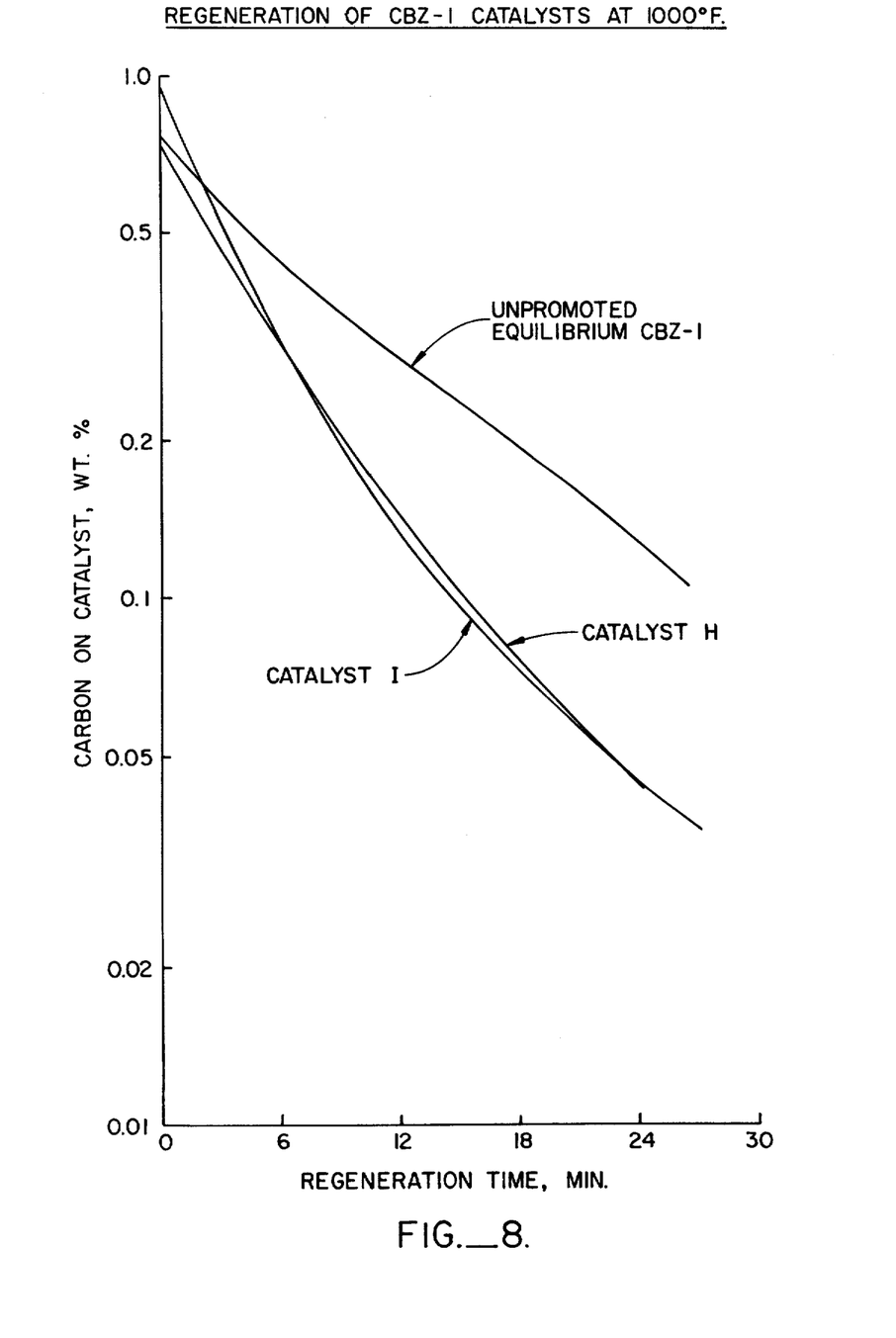
FIG. 8 shows the comparative completeness and coke burnoff in regeneration of a catalyst according to the invention and two other catalysts.

Catalysts H and I were tested by the same method described in Examples II and VII. The measured coke-burning rates on the fifth cycle are given in FIG. 8. The burning rates of Catalysts H and I are nearly identical; 0.9% lanthanum and 0.1% iron together are as effective as 2.0% lanthanum alone. Analysis of the off-gas from these regenerations showed that the iron-lanthanum promoter was also an effective catalyst for the combustion of CO to $CO_2$. The product distribution from these cracking runs is given in Table VI:

Table VI

|  | Equilibrium | CBZ-1 | H | I |
|---|---|---|---|---|
| Conversion, Wt.% | | | | |
| Below 430° F. |  | 40.45 | 38.48 | 41.36 |
| Below 625° F. |  | 64.60 | 62.90 | 65.40 |
| Product Composition, Wt.% | | | | |
| Hydrogen |  | 0.02 | 0.02 | 0.06 |
| Methane |  | 0.64 | 0.57 | 0.61 |
| Total $C_2$ |  | 1.11 | 0.98 | 1.06 |
| Total $C_3$ |  | 2.73 | 2.16 | 2.51 |
| Total $C_4$ |  | 4.21 | 3.45 | 3.99 |
| Total $C_5$ |  | 3.57 | 2.85 | 3.16 |
| $C_5$-250° F. |  | 13.51 | 11.44 | 13.20 |
| 250° F. –430° F. |  | 15.14 | 16.85 | 15.89 |
| 430° F.–625° F. |  | 24.15 | 24.43 | 24.04 |
| 625° F. + |  | 35.40 | 37.10 | 34.60 |
| Coke |  | 3.08 | 3.03 | 3.05 |

Catalyst I is slightly more active than the unpromoted CBZ-1, while in Catalyst H some activity is sacrificed. Catalyst I produces somewhat more hydrogen, which is consistent with the recognized behavior of iron-containing cracking catalysts. Runs in a fluid catalytic cracking pilot plant demonstrated that the promoting activity of the iron-lanthanum combination is satisfactorily stable to protracted use.

What is claimed is:

1. A catalyst composition comprising 1 to 80 weight percent of a zeolitic crystalline aluminosilicate, 0.05 to 10 weight percent lanthanum, calculated as the elemental metal and excluding lanthanum in the crystal structure of said aluminosilicate, and 0.05 to 10 weight percent iron, calculated as the elemental metal and excluding iron in the crystal structure of said zeolite, said lanthanum, iron and aluminosilicate being dispersed in a porous, refractory matrix.

2. A composition according to claim 1 wherein said matrix comprises an amorphous mixture of silica and alumina.

3. A composition according to claim 1 wherein said zeolite comprises about 5 to about 20 weight percent of said composition.

4. A composition according to claim 1 wherein said zeolite has a fajuasite crystal structure.

5. A composition according to claim 1 wherein said composition includes 0.5 to 4 weight percent lanthanum.

* * * * *